May 15, 1956  W. GARTEN  2,745,778
METHOD OF LINING A METAL PIPE
Filed June 19, 1952

INVENTOR
WILHELM GARTEN
BY Robert H. Jacob
AGENT

1

2,745,778
METHOD OF LINING A METAL PIPE

Wilhelm Garten, Hagen, Westphalia, Germany

Application June 19, 1952, Serial No. 294,447

Claims priority, application Germany August 18, 1951

3 Claims. (Cl. 154—82)

The present invention relates to a method and means for lining pipes with rubber, plastics or the like material.

In lining pipes of iron or other metals two methods are usually employed.

A tube is pulled into the pipe which has been previously coated on the inside with an adhesive. In this connection the outer diameter of the tube must be smaller than the inside diameter of the pipe. To expand the tube and press it against the walls of the pipe an elastic stopper is pulled through the tube by means of a cord or a wire. Since the tube is not sufficiently fastened to the walls of the pipe from the first passage through of the stopper, the elastic tube is extended and partly it also pulls loose from the pipe. This results in bulges and, therefore, in defective products.

It has already been proposed, in order to overcome this shortcoming, to force the tube against the walls of the pipe by means of compressed air in that one end of the tube or of the pipe and the tube is closed and compressed air is blown in at the other end. Howevr, also this method easily results in defective products because the air between tube and pipe cannot readily escape and the air which remained causes bulges between the pipe and the lining.

The method in accordance with the invention avoids these shortcomings in that a stopper which acts in a manner similar to a valve is forced through the metal pipe after coating the inside of the metal pipe with a layer of adhesive and pulling the rubber tube into the pipe.

Furthermore the invention relates to a stopper which acts in the manner of a valve for carrying out the method. In accordance with the invention the stopper is provided with several rings of soft rubber which press the tube against the inner walls of the pipe and which, at the same time, cut off the compressed air.

It is suitable to provide the stopper with several metal rings between which the rings of soft rubber are disposed and to combine them into a valve body by means of bolts and nuts. By means of the method in accordance with the invention the air which is between metal pipe and the tube which is to be pulled into it is systematically expelled. The tube which is first pressed against the pipe wall by the valve is further pressed against the adhesive coated pipe wall by the compressed air which follows the valve, so that the tube cannot stretch after being pressed on by the valve.

The invention will be explained in greater detail with reference to a practical embodiment illustrated in the accompanying drawings in which:

2

Figure 1:
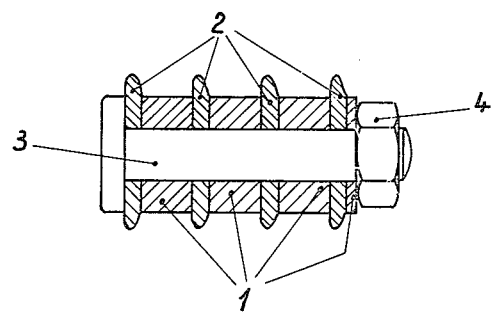
Fig. 1 shows a cross section of the stopper.
Figure 2:
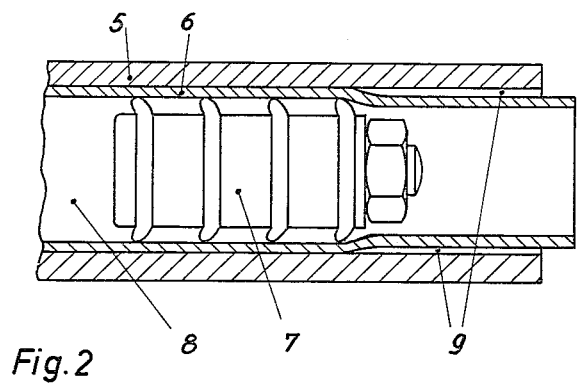
Fig. 2 shows a stopper in accordance with the invention inside of a metal tube.

As shown, the stopper comprises a plurality of rings 2 of soft rubber which are combined into a valve member by means of bolt 3 and nut 4. Metal rings 1 are disposed intermediate the rubber rings 2. As indicated in Fig. 2 the stopper 7 presses the rubber tube 6 against the inner wall of the metal pipe 5 which is to be lined. The rubber tube is already pressed on in the section 8 of the pipe, while it does not yet adhere in the section 9 and air is still present between the tube and the pipe.

The stopper is forced through the rubber tube 6 in pipe 5 by air pressure applied through a nozzle at the left end of the pipe as viewed in Fig. 2. The air pressure causes the stopper 7 to travel through the rubber tube 6 pressing the same against the walls of pipe 5 and since it prevents the air from escaping, air pressure is built up behind the stopper, which air pressure holds the rubber tube lining 6 firmly against the wall of pipe 5 until the adhesive sets and adhesion is complete.

Having now fully described my invention with reference to the practical embodiment illustrated, what I claim is:

1. Method for lining pipes of metal with tubing of rubber including the steps of coating the metal pipe with an adhesive, pulling the tubing inside the pipe and driving a stopper in the form of an air tight valve member through the tubing and the pipe by means of compressed air applied at the end of the tubing where the stopper enters, and maintaining the air pressure behind the stopper until the tubing adheres to the pipe.

2. The method of lining pipe which comprises coating the inner surface of the pipe with an adhesive material, positioning a flexible tubular lining within the pipe, placing a stopper in the form of a movable air tight valve member within one end of the lining and pipe, and applying fluid under pressure to said one end of the pipe forcing the stopper through the lining and pipe and forcing the lining against the adhesive coated inner surface of the pipe.

3. The method of lining a metal pipe with a rubber lining comprising coating the inner surface of the pipe with an adhesive material, positioning a rubber tubular lining within the pipe, placing a stopper in the form of a movable air tight valve member within one end of the lining and pipe, applying fluid under pressure to said one end of the pipe forcing the stopper through the lining and the pipe and the lining against the adhesive coated inner surface of the pipe, and maintaining fluid under pressure in the lining and pipe behind the stopper until the lining adheres to the pipe.

References Cited in the file of this patent
UNITED STATES PATENTS

| Number | Name | Date |
|---|---|---|
| 1,164,600 | Forster | Dec. 14, 1915 |
| 1,721,838 | Semon et al. | July 23, 1929 |
| 2,312,993 | Stephens | Mar. 2, 1943 |
| 2,430,273 | Browning | Nov. 4, 1947 |
| 2,516,242 | Munger | July 25, 1950 |
| 2,542,390 | Brown | Feb. 20, 1951 |
| 2,572,215 | Swart | Oct. 23, 1951 |
| 2,621,885 | Schmitt | Dec. 16, 1952 |
| 2,695,255 | Avery | Nov. 23, 1954 |